United States Patent
Fujishima et al.

Patent Number: 6,099,695
Date of Patent: *Aug. 8, 2000

[54] ZNO-PD COMPOSITE CATALYST AND PRODUCTION METHOD THEREOF

[75] Inventors: Akira Fujishima, 710-5, Nakamaruko, Nakahara-Ku, Kawasaki-shi, Kanagawa-ken, 211; Kazuhito Hashimoto, 2073-2-D213, Iijima-cho, Sakae-ku, Yokohama-shi, Kanagawa-ken, 244; Shuzo Moroto, Aichi-ken; Masao Ando, Aichi-ken; Masako Sakai, Aichi-ken, all of Japan

[73] Assignees: Akira Fujishima; Kazuhito Hashimoto; Kabushikikaisha Equos Research; Aisin AW Co., Ltd., all of, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/910,207

[22] Filed: Aug. 13, 1997

[30] Foreign Application Priority Data

Aug. 30, 1996 [JP] Japan ................................. 8-248888

[51] Int. Cl.[7] ................................................. C01B 31/20
[52] U.S. Cl. ............... 204/157.44; 423/230; 423/244.01; 423/244.02; 423/247; 423/437.2; 502/329
[58] Field of Search ..................... 502/325, 328, 502/329, 349, 350; 423/244.01, 244.02, 437.2, 247, 230; 204/157.44

[56] References Cited

U.S. PATENT DOCUMENTS

| | | | |
|---|---|---|---|
| 3,670,044 | 6/1972 | Drehman et al. | 585/433 |
| 3,911,080 | 10/1975 | Mehl et al. | 423/244.01 |
| 4,520,125 | 5/1985 | Baer et al. | 502/170 |
| 4,522,792 | 6/1985 | Brennan | 423/437.2 |
| 5,077,261 | 12/1991 | Schubert | 423/244.02 |
| 5,128,305 | 7/1992 | Yoshimoto et al. | 502/243 |
| 5,227,356 | 7/1993 | Hess et al. | 502/217 |
| 5,665,223 | 9/1997 | Bogdan | 208/138 |

FOREIGN PATENT DOCUMENTS

| | | | |
|---|---|---|---|
| 215709 | 3/1987 | European Pat. Off. | 423/244.02 |
| 0266875 | 5/1988 | European Pat. Off. | |
| 0798143 | 10/1997 | European Pat. Off. | |
| 3405100 | 8/1985 | Germany . | |
| 236679 | 6/1986 | Germany | 423/244.02 |
| 232246 | 11/1985 | Japan | 423/437.2 |
| 263634 | 11/1986 | Japan | 423/244.02 |
| 1234729 | 9/1989 | Japan . | |

*Primary Examiner*—Wayne Langel
*Attorney, Agent, or Firm*—Lorusso & Loud

[57] ABSTRACT

A ZnO—Pd composite catalyst wherein Pd is dispersed and fixed on the surface of ZnO is produced by ion adsorption process having the steps of soaking ZnO in an acid solution of Pd to adsorb Pd ions ($Pd^{2+}$) onto the surface of ZnO; and reducing the adsorbed Pd ions to metallic Pd particles so that the metallic Pd particles are substantially evenly deposited on the surface of ZnO. The ZnO—Pd composite catalyst provides a stable and continuing CO oxidizing capability, without light irradiation, even when the air to be treated contains sulfur compounds such as $H_2S$ and $SO_x$.

3 Claims, 6 Drawing Sheets

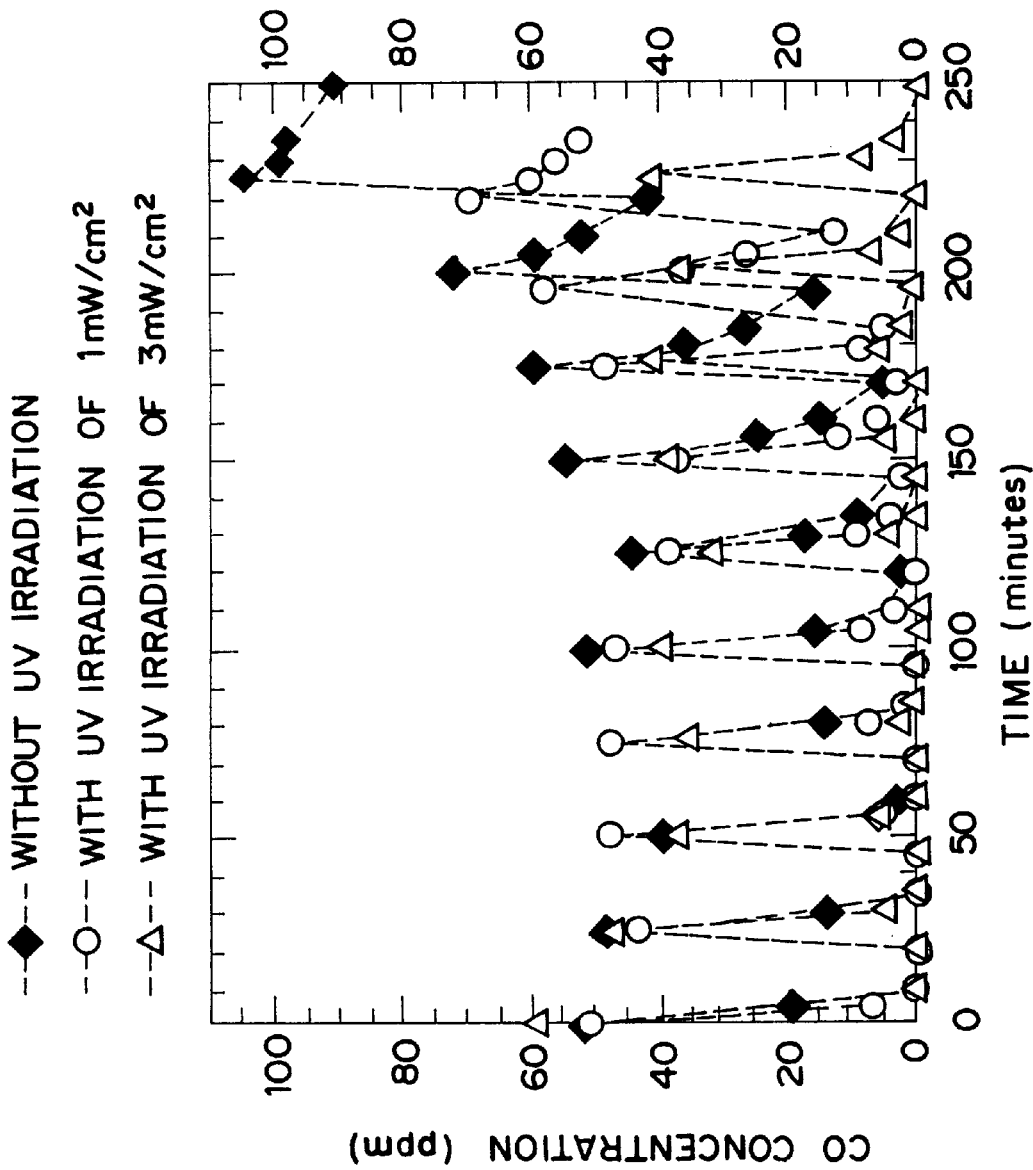

_6,099,695_

ZNO-PD COMPOSITE CATALYST AND PRODUCTION METHOD THEREOF

BACKGROUND OF THE INVENTION

1. Field of the Invention

The present invention relates to a ZnO—Pd composite catalyst capable of eliminating hazardous components from the air, such as CO and NOx.

2. Description of the Prior Art

Examples of hazardous gases which enter or are generated in an automobile include CO, NOx and sulfur compounds (such as $H_2S$ and SOx). Pd is known as a catalyst effective in eliminating these components, especially in oxidizing and decomposing CO, at a normal temperature. Japanese Patent Publication (JPA) No. 1-234729 teaches an air cleaner comprising a photocatalyst supported on an adsorbent for decomposing odor components and oxidizing NOx adsorbed by the adsorbent, when the photocatalyst is irradiated by a light beam.

Among platinum group catalysts which are effective in eliminating CO by its oxidation, Pd has a catalytic activity higher than that of Pt at normal temperature. However, sulfur compounds (such as $H_2S$ and SOx) coexisting in the air to be treated would serve as a catalyst poison to Pd, so that when an air filter with Pd catalyst is used for purifying the air containing the sulfur compounds, Pd would be poisoned by the sulfur compounds to gradually degrade its catalytic activity. Pt is not susceptible to poisoning by the sulfur compounds and, therefore, has been mainly used in the prior art air filters. However, Pt has a lower catalyst activity and is much more expensive than Pd.

SUMMARY OF THE INVENTION

Accordingly, an object of the present invention to provide a novel catalyst capable of eliminating the drawbacks of the prior art catalysts.

Another object of the present invention is to provide a catalyst suitable to use in an automobile passenger compartment where CO and sulfur compounds coexist in the atmosphere.

According to one aspect of the present invention there is provided a ZnO—Pd composite catalyst wherein Pd is dispersed and fixed on the surface of ZnO.

In this aspect of the present invention, Pd is dispersed and fixed on the surface of ZnO by an ion adsorption method so that the surface area of the Pd in contact with the ambient air is larger as compared with the prior art catalyst of Pd alone. Therefore, CO contained in the air to be purified is effectively oxidized to $CO_2$ where the air contacts Pd, namely on the surface of the Pd. The ZnO may be used in various forms such as powder, crystals and films.

Furthermore, sulfur compounds contained in the air such as SOx and $H_2S$ are adsorbed by ZnO in preference to Pd, and thus are not likely to be adsorbed by the Pd. Accordingly, Pd in the composite catalyst of the present invention is prevented from seriously damage by the catalyst poisoning of the sulfur compounds and thus provides stable and continuing CO oxidizing catalysis.

ZnO has been known as a typical photocatalyst that provides catalysis when being subjected to light irradiation. However, the ZnO—Pd composite catalyst of the present invention adsorbs the sulfur compounds such as SOx and $H_2S$ onto the surface of ZnO at a normal temperature without irradiation. More particularly, $H_2S$ is adsorbed on the surface of ZnO in the form of ZnS, and SOx is adsorbed on the surface of ZnO after reacting with ZnO or without such reaction. Thus, the CO oxidizing catalysis of the platinum group catalyst (Pd) is not affected by the sulfur compounds.

The platinum group catalyst (Pd) is contained in the ZnO—Pd composite catalyst of the present invention, preferably in a quantity of 0.002 to 10.0% by weight, more preferably 0.1 to 1.0% by weight of ZnO. In view of such a ratio between ZnO and Pd, the ZnO is capable of adsorbing a sufficient quantity of the sulfur compounds, so that the composite catalyst of the present invention can be used for a longer period of time with no practical need for regenerating treatment.

In accordance with another aspect of the present invention there is provided a composite catalyst obtained by further combining $TiO_2$ with a ZnO—Pd composite catalyst. As described above, the sulfur compounds are adsorbed on the surface of the ZnO. In the ZnO—Pd—$TiO_2$ composite catalyst, the sulfur compounds which have been adsorbed on the surface of the ZnO are oxidized and decomposed by the photocatalysis of $TiO_2$ when it is irradiated. The catalyst is thus regenerated and provides much longer life.

BRIEF DESCRIPTION OF THE DRAWINGS

FIG. 8 is a graph showing the poisonous effect of sulfur compounds on Pd catalysis of a comparative the $TiO_2$—Pd composite catalyst for comparison with that of ZnO—Pd composite catalyst of the present invention.

DETAILED DESCRIPTION OF THE PREFERRED EMBODIMENTS

In a preferred embodiment, a ZnO—Pd composite catalyst of the present invention, in which Pd is dispersed on the surface of ZnO, is produced by a Pd ion adsorption method which is described below.

For example, surface treatment of powdery ZnO is conducted in an aqueous solution of $PdCl_2$ of pH 2.5 so that the surface of the powdery ZnO is dissolved, and subsequent to such dissolving reaction, a divalent palladium ion is adsorbed onto the ZnO. The reaction is represented by the following Formula (1):

$$ZnO + Pd^{2+} + 2H^+ \rightarrow Zn^{2+} + Pd^{2+}_{ad} + H_2O \quad \text{Formula (1)}$$

Then, the surface-treated ZnO is soaked in a solution containing a reducing agent so that the divalent palladium is reduced to convert the Pd ions into Pd metal which is precipitated. This reaction is represented by the following Formula (2) where formalin is used as the reducing agent:

$$Pd^{2+}_{ad} + HCHO + 3OH^- \rightarrow Pd^0_{ad} + HCOO^- + 2H_2O \quad \text{Formula (2)}$$

ZnO is dissolved in acid conditions. In the reaction of Formula (1), ZnO is dissolved progressively with time in the aqueous solution of $PdCl_2$. As a competing reaction of dissolution of ZnO, palladium ions are adsorbed. More specifically, a quantity of zinc ions dissolves into the $PdCl_2$ solution and a quantity of palladium ions is adsorbed onto the ZnO surface, which phenomena are proportional during the reaction of Formula (1). Thus, the palladium ions are substantially evenly dispersed and adsorbed onto the roughly etched surface of ZnO and then fixed as Pd metal particles by the reductive reaction of Formula (2). Pd in the thus obtained ZnO—Pd composite catalyst has a large surface area for contact with the ambient air, thereby improving its air-purifying efficiency. Further, the surface of ZnO is exposed to the ambient air between the dispersed and adsorbed Pd particles, whereby it can adsorb such sulfur compounds as $H_2S$ and SOx contained in the ambient air.

Figure 1:
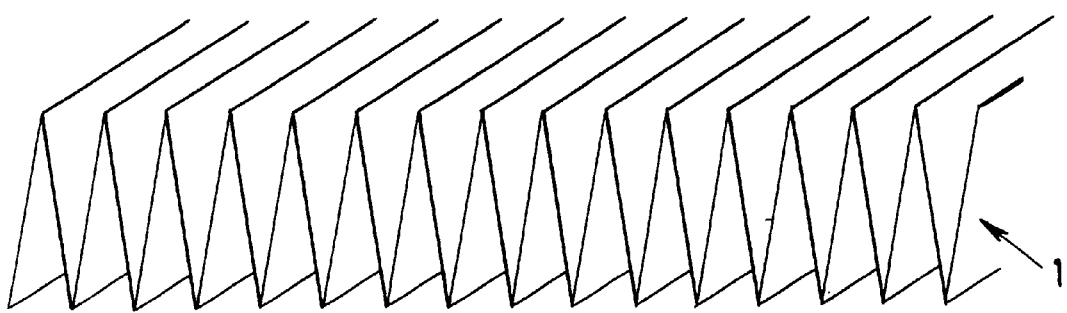
FIG. 1 is a schematic view showing an example of an air-purifying filter comprising a carrier base and a composite catalyst of the present invention carried by the carrier base, which is formed into a pleated shape.
Figure 2:
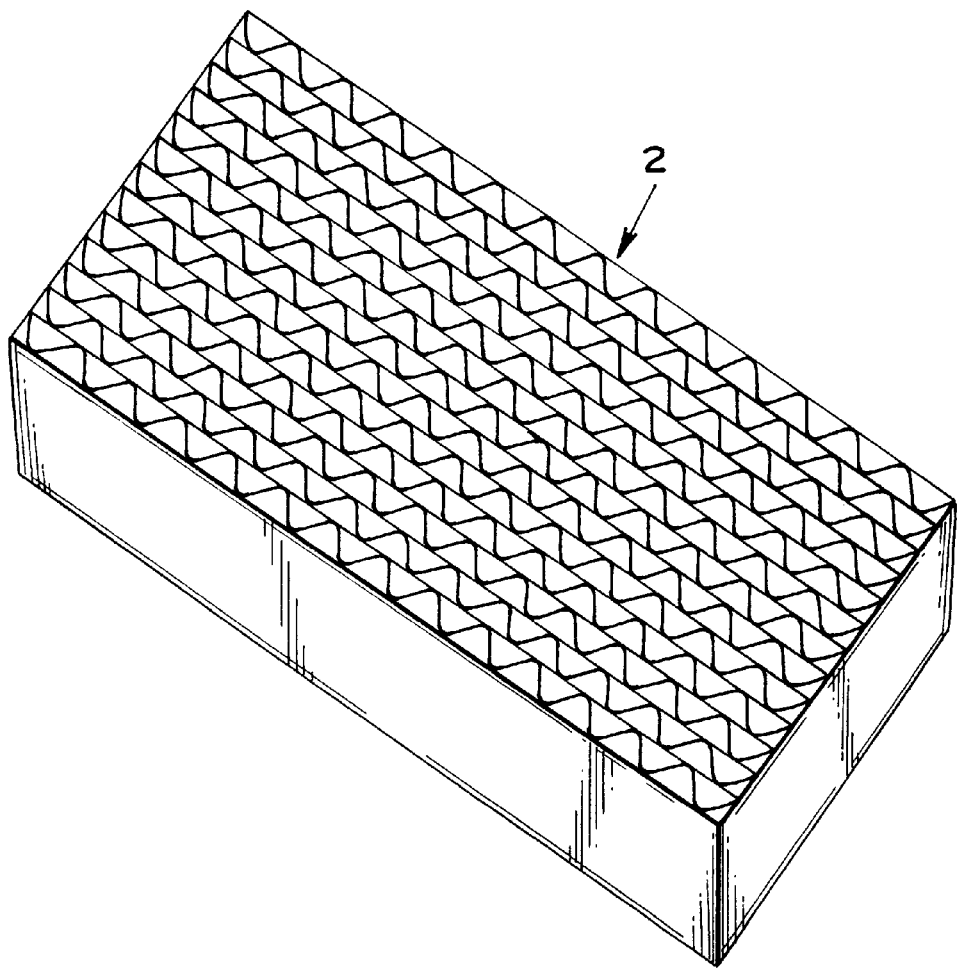
FIG. 2 is a schematic view showing another example of the air-purifying filter that is formed into a honeycomb shape.

The ZnO—Pd composite catalyst of the present invention is usable in an air-purifying filter adapted for use in an automobile passengers compartment. The air-purifying filter is preferably formed into a shape having a large area in contact with the ambient air, a small pressure loss, a large catalyst surface area and a good ultraviolet ray irradiating efficiency. Some examples of the shape preferred for the air-purifying filter include a honeycomb shape, a pleated shape and a corrugated shape. By way of example, FIG. 1 shows a filter 1 having a pleated construction and FIG. 2 shows another filter 2 of a honeycomb shape. The filter may also have a mesh structure.

A catalyst carrier for the filter may be a thin plate of a metal material having a good heat conductivity such as stainless steel, copper or aluminum. A molded (felt type, paper type, woven fabric type, etc.) product of active carbon fibers, active carbon powders and gel, glass material and ceramics may also be used as the catalyst carrier of the filter. Active carbon is also effective as an adsorbent of various odor components.

A composite catalyst wherein Pd is carried on ZnO may be supported on the catalyst carrier. Alternatively, the composite catalyst is mixed with a molding material and the resulting mixture is molded into a predetermined shape for the catalyst carrier. The composite catalyst may be supported by mixing, addition, application, thermal spraying, soaking, electrodeposition or molding, at the time of molding the catalyst carrier or at a desired stage after molding.

When an air cleaner with the air-purifying filter is mounted in an automobile, it is possible to arrange, upstream of the air to be treated, a preliminary filter of an active carbon fiber or photocatalyst such as $TiO_2$ for adsorbing and eliminating NOx and odor components.

Figure 3:
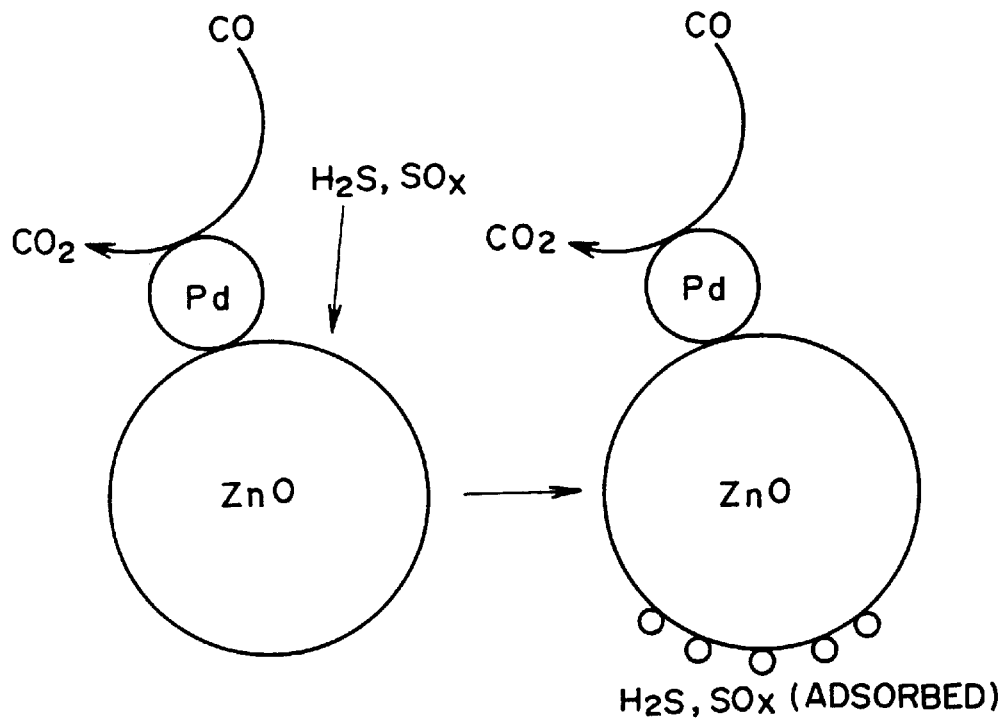
FIG. 3 is a schematic view showing an air-purifying reaction mechanism of a ZnO—Pd composite catalyst of the present invention.

FIG. 3 shows the reaction mechanism of the ZnO—Pd composite catalyst of the present invention. Pd oxidizes CO in the air to $CO_2$, which proceeds regardless of light irradiation. The sulfur compounds such as $H_2S$ and SOx are selectively adsorbed by ZnO. FIG. 3 is a diagram schematically illustrating the reaction mechanism of a ZnO—Pd composite catalyst. The reaction of converting CO to $CO_2$ by the CO oxidizing function of Pd proceeds regardless of light irradiation. On the other hand, sulfur compounds such as $H_2S$ are selectively adsorbed by ZnO.

Figure 4:
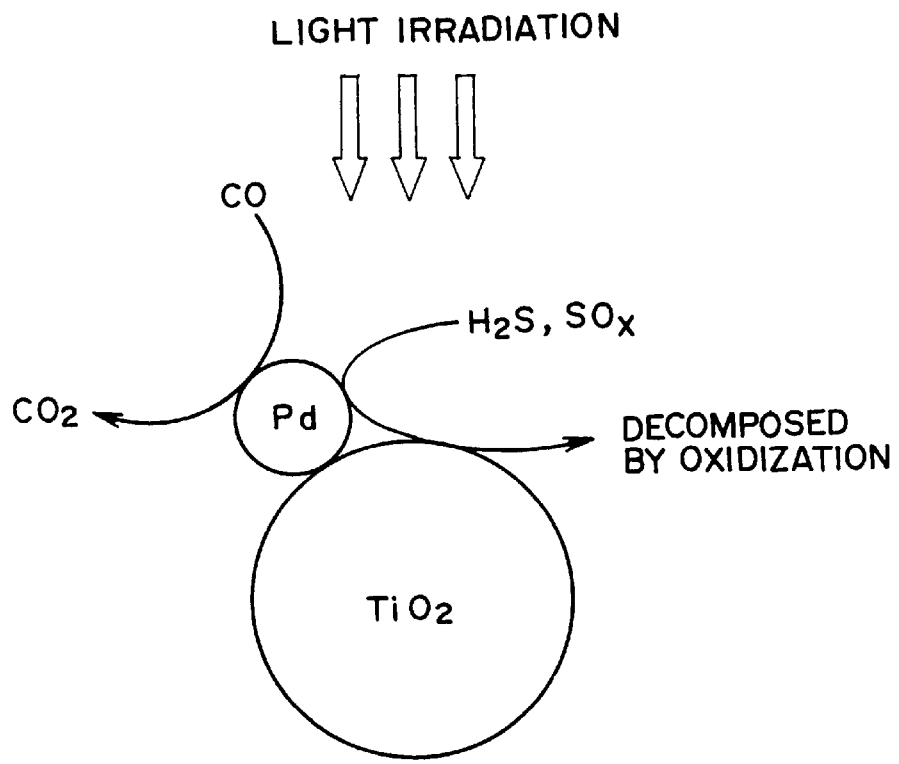
FIG. 4 is a schematic view showing an air-purifying reaction mechanism of a $TiO_2$—Pd composite catalyst, for comparison with the ZnO—Pd composite catalyst of the present invention shown in FIG. 3.

FIG. 4 schematically shows the reaction mechanism of the CO oxidizing function of a $TiO_2$—Pd composite catalyst for comparison with the ZnO—Pd composite catalyst of the present invention. Since $TiO_2$ is not capable of adsorbing the sulfur compounds, it is necessary that the catalyst is continuously irradiated by a light beam to oxidize the sulfur compounds to $SO_4^{-2}$, which is not seriously poisonous to Pd.

Experiment 1

Figure 5:
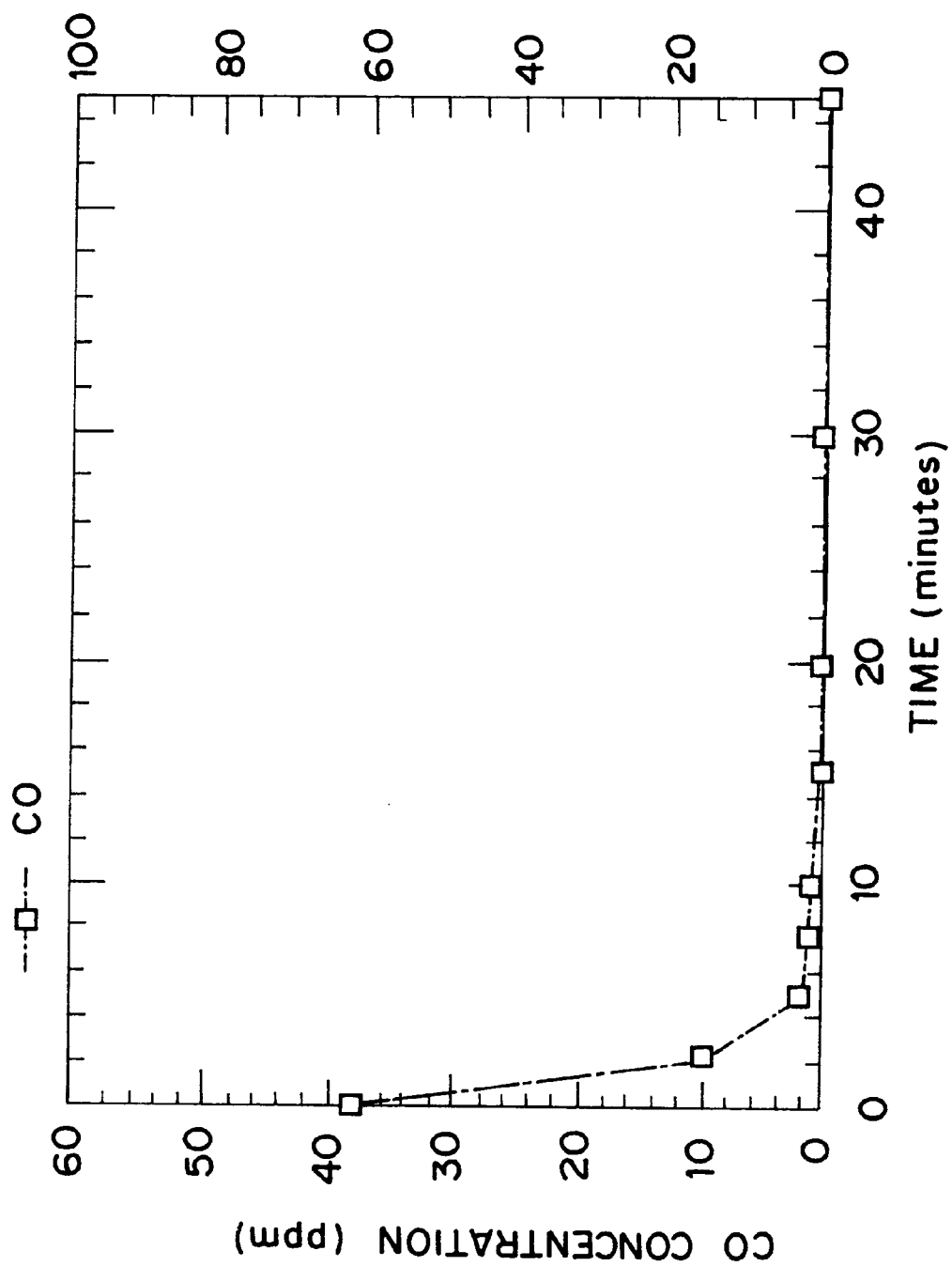
FIG. 5 is a graph showing the results of Experiment 1 and confirming the high CO oxidizing capacity of a ZnO—Pd composite catalyst of the present invention.

This experiment was conducted to confirm that a ZnO—Pd composite catalyst of the present invention has an improved CO oxidizing function. More particularly, Pd was supported the surface of powdery ZnO by the Pd ion adsorption method to obtain a ZnO—Pd composite catalyst in which Pd is supported in a quantity of 0.1% by weight of ZnO. 17 g of the obtained ZnO—Pd composite catalyst was placed in a laboratory dish having a specimen area of $4.3^2$ $cm^2$, and then it was placed in a 500-ml container. 50 ppm of CO was introduced into the container and the CO concentration was measured with time. The results are shown in FIG. 5. As shown, CO concentration was decreased very rapidly to substantially zero.

Experiment 2

This experiment was conducted to confirm that a ZnO—Pd composite catalyst of the present invention alleviates the poisonous effect of the sulfur compounds to provide a stable and continuing CO oxidizing capability. The ZnO—Pd composite catalyst, which was obtained in the same manner as in Experiment 1, was placed in a Laboratory dish having a specimen area of $4.3^2$ $cm^2$, and then it was placed in a 500-ml container. To the container, 50 ppm of CO and a predetermined quantity of $H_2S$ were additionally introduced at 10 minute intervals starting 30 minutes later, as shown in the following Table 1. This experiment was conducted without light irradiation.

TABLE 1

| TIME (minutes) | CO QUANTITY (ppm) | $H_2S$ QUANTITY (ppm) |
|---|---|---|
| 30 | 50 | 200 |
| 40 | 50 | 200 |
| 50 | 50 | 400 |
| 60 | 50 | 200 |
| 70 | 50 | 600 |
| 80 | 50 | 1200 |

Figure 6:
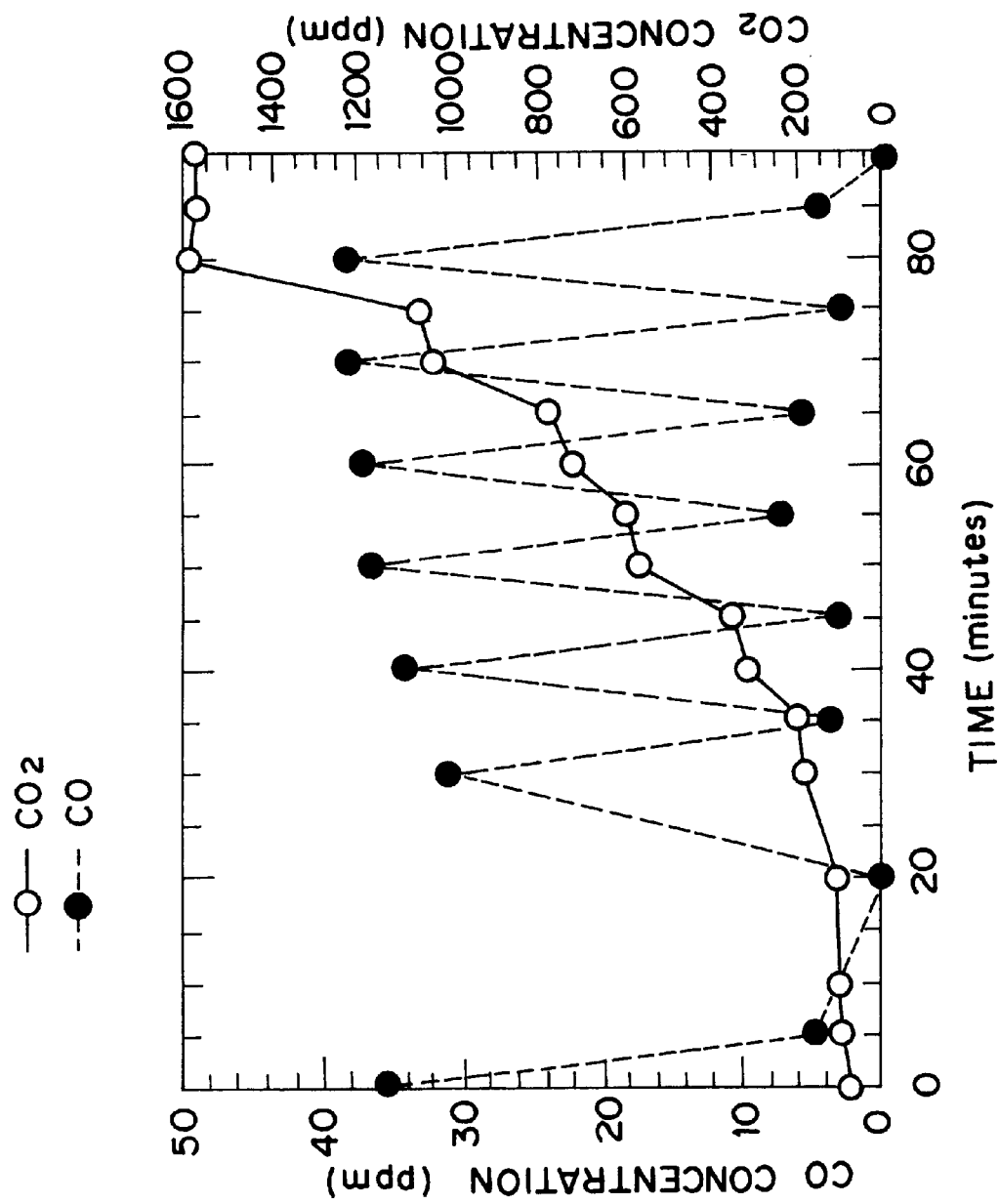
FIG. 6 is a graph showing the results of Experiment 2 demonstrating that the poisonous effect of sulfur compounds on Pd catalysis is alleviated in a ZnO—Pd composite catalyst of the present invention, which allows the catalyst to provide a stable and continuing CO oxidizing capacity.

The results are shown in FIG. 6 representing CO and $CO_2$ concentrations varying with time. The originally existing CO was substantially completely eliminated by its oxidization to $CO_2$ within 20 minutes, which coincides with the results in Experiment 1 shown in FIG. 5. The results in FIG. 6 also show that, although considerable quantities of CO and $H_2S$ were added at a constant time interval, CO concentration was greatly lowered immediately after CO addition whereas $CO_2$ concentration was almost continuously increased. This means that Pd in the ZnO—Pd composite catalyst remains free from the poisonous effect of $H_2S$, and the ZnO—Pd composite catalyst of the present invention provides a long-continuing and rapid CO oxidization.

Comparative Tests

Figure 7:
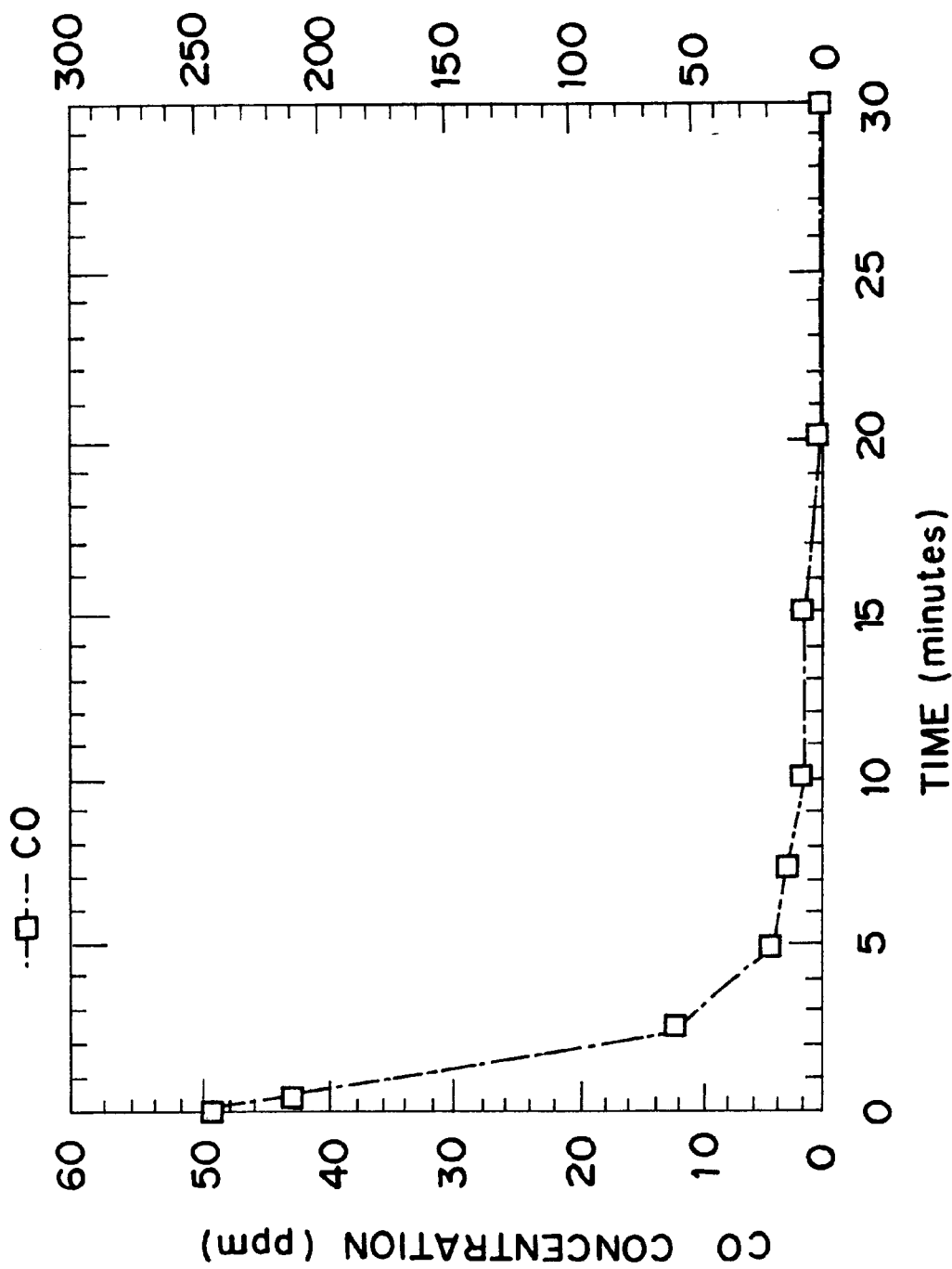
FIG. 7 is a graph showing the CO oxidizing capacity of a comparative $TiO_2$—Pd composite catalyst for comparison with that of the ZnO—Pd composite catalyst of the present invention.

As a comparative test with respect to Experiment 1, Pd was deposited by the optical electrodeposition method on $TiO_2$ known as a photocatalyst, and 50 ppm of CO was introduced once and CO concentration was measured as in Experiment 1. The results are shown in FIG. 7. As a comparative test with respect to Experiment 2, 50 ppm of each of CO and $H_2S$ were introduced every 25 minutes, without light irradiation, with light irradiation of 1 mW/cm$^2$ and 3mW/cm$^2$, and CO and $CO_2$ concentrations varying with time measurement were measured in the same manner as in Experiment 2. The results are shown in FIG. 8.

From the results shown in FIG. 7, it can be understood that the $TiO_2$—Pd composite catalyst is capable of removing CO by oxidization to $CO_2$, which is almost comparable with the ZnO—Pd composite catalyst of the present invention. In comparison with the results shown in FIG. 5, CO oxidizing speed of the $TiO_2$—Pd composite catalyst is slightly slower than that of the ZnO—Pd composite catalyst. This would be because Pd is more dispersed in the ZnO—Pd composite catalyst as compared to the $TiO_2$—Pd composite catalyst.

However, as clearly understood from the results shown in FIG. 8, CO oxidizing capacity of the $TiO_2$—Pd composite catalyst is degraded with time when irradiated with only 1 mW/cm$^2$ and much more degraded without irradiation.

As has been described, a ZnO—Pd composite catalyst of the present invention has Pd fixed on the surface of ZnO in a highly dispersed state and, even when the air to be treated contains sulfur compounds such as $H_2S$ and SOx, it provides stable and continuing CO oxidizing capability, without being poisoned by the sulfur compounds, with no need of light irradiation.

When a ZnO—Pd composite catalyst of the present invention is used to produce an air-purifying filter to be mounted in an automobile, it is particularly advantageous that the filter also includes a material with NOx eliminating effect such as an active carbon fiber and $TiO_2$.

Although the present invention has been described in connection with specific preferred embodiments thereof, it is to be understood that the present invention is not limited to these embodiments and that various changes and modifications may be effected therein by one skilled in the art without departing from the spirit and scope of the invention as defined in the appended claims.

What is claimed is:

1. A process for purifying air containing CO and gaseous sulfur compounds comprising:

providing a composite catalyst comprising Pd, ZnO and $TiO_2$ as catalytically active components, said ZnO being in the form of a particulate carrier supporting said Pd on its surface, said Pd and being dispersed on the surface of particles of the ZnO so as to leave surface areas of the ZnO particles exposed to the air;

contacting the air with the composite catalyst to oxidize the CO to $CO_2$ and to adsorb the gaseous sulfur compounds onto the exposed surface area of the ZnO particles; and irradiating said catalyst with light such that said $TiO_2$ oxidizes said gaseous sulfur compounds to sulfate ions which are not poisonous to said Pd.

2. A process according to claim 1 wherein said irradiating is conducted during said contacting.

3. A process according to claim 1 wherein said irradiating is continuously conducted during said contacting.

* * * * *